United States Patent
Morishima

(10) Patent No.: US 11,982,844 B2
(45) Date of Patent: May 14, 2024

(54) METHOD FOR ESTIMATING ORIENTATION OF OPTICAL FIBER AND METHOD FOR MANUFACTURING OPTICAL-FIBER COMPONENT

(71) Applicant: SUMITOMO ELECTRIC INDUSTRIES, LTD., Osaka (JP)

(72) Inventor: Tetsu Morishima, Osaka (JP)

(73) Assignee: SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

(21) Appl. No.: 18/033,455

(22) PCT Filed: Dec. 10, 2021

(86) PCT No.: PCT/JP2021/045606
§ 371 (c)(1),
(2) Date: Apr. 24, 2023

(87) PCT Pub. No.: WO2022/138244
PCT Pub. Date: Jun. 30, 2022

(65) Prior Publication Data
US 2023/0408773 A1  Dec. 21, 2023

(30) Foreign Application Priority Data
Dec. 22, 2020  (JP) ................. 2020-212740

(51) Int. Cl.
G02B 6/38  (2006.01)
G01M 11/00  (2006.01)

(52) U.S. Cl.
CPC .......... *G02B 6/3843* (2013.01); *G01M 11/37* (2013.01); *G02B 6/3839* (2013.01)

(58) Field of Classification Search
CPC ... G02B 6/2555; G02B 6/3839; G02B 6/3843
See application file for complete search history.

(56) References Cited

U.S. PATENT DOCUMENTS 4,416,507 A * 11/1983 Hulin .................. G02B 6/3869
                                                 385/59
5,578,156 A    11/1996 Kamakura et al.
(Continued)

FOREIGN PATENT DOCUMENTS

JP    H07-199007 A    8/1995
JP    2004-138736 A   5/2004
(Continued)

OTHER PUBLICATIONS

Sasaki et al., "Asymmetrically Arranged 8-Core Fibers with Center Core Suitable for Side-View Alignment in Datacenter Networks," 2020 Optical Fiber Communication Conference and Exhibition (OFC), IEEE, 2020, pT4J.1.

*Primary Examiner* — Jason L Vaughan
(74) *Attorney, Agent, or Firm* — Oliff PLC

(57) ABSTRACT

A method for estimating an orientation around a central axis of an optical fiber includes radiating light from a light source toward a side surface of the optical fiber, capturing an image of the side surface of the optical fiber by receiving the light transmitted through the optical fiber at a plurality of pixels disposed along a direction intersecting the central axis of the optical fiber, generating a luminance profile for the optical fiber based on a luminance value of light received by the plurality of pixels, and estimating an orientation around the central axis of the optical fiber using the luminance profile.

15 Claims, 10 Drawing Sheets

(56) References Cited

U.S. PATENT DOCUMENTS

| | | | |
|---|---|---|---|
| 8,699,012 B2* | 4/2014 | Duis | G01B 11/27 |
| | | | 356/73.1 |
| 2014/0044339 A1* | 2/2014 | Onozaki | G02B 6/2553 |
| | | | 382/141 |
| 2018/0372954 A1 | 12/2018 | Matsui et al. | |
| 2020/0064549 A1* | 2/2020 | Nishina | G06N 3/088 |

FOREIGN PATENT DOCUMENTS

| | | |
|---|---|---|
| JP | 2005-173210 A | 6/2005 |
| JP | 2015-145989 A | 8/2015 |
| JP | 2020-020998 A | 2/2020 |
| WO | 2005/045495 A1 | 5/2005 |
| WO | 2017/130627 A1 | 8/2017 |

* cited by examiner

METHOD FOR ESTIMATING ORIENTATION OF OPTICAL FIBER AND METHOD FOR MANUFACTURING OPTICAL-FIBER COMPONENT

TECHNICAL FIELD

The present disclosure relates to a method for estimating an orientation of an optical fiber and a method for manufacturing an optical fiber component. This application is based upon and claims the benefit of priority from Japanese Patent Application No. 2020-212740 filed on Dec. 22, 2020, the entire contents of which are incorporated herein by reference.

BACKGROUND ART

For an optical fiber of which an internal structure is not axially symmetrical, such as a multi-core optical fiber, it is required to identify an orientation around a central axis. Non-Patent Literature 1 discloses estimating of the orientation by monitoring a luminance at a predetermined position on an observed image obtained by capturing an image of a multi-core optical fiber from the side.

CITATION LIST

Patent Literature

[Non-Patent Literature 1] Sasaki et al., "Asymmetrically Arranged 8-core Fibers with Center Core Suitable for Side-view Alignment in Datacenter Networks", OFC2020, T4J. 1(2020)

SUMMARY OF INVENTION

A method for estimating an orientation of an optical fiber according to the present disclosure includes radiating light from a light source toward a side surface of the optical fiber, capturing an image of the side surface of the optical fiber by receiving the light transmitted through the optical fiber at a plurality of pixels disposed along a direction intersecting a central axis of the optical fiber, generating a luminance profile for the optical fiber based on a luminance value of light received by the plurality of pixels, and estimating an orientation around the central axis of the optical fiber using the luminance profile.

DESCRIPTION OF EMBODIMENTS

Figure 1:
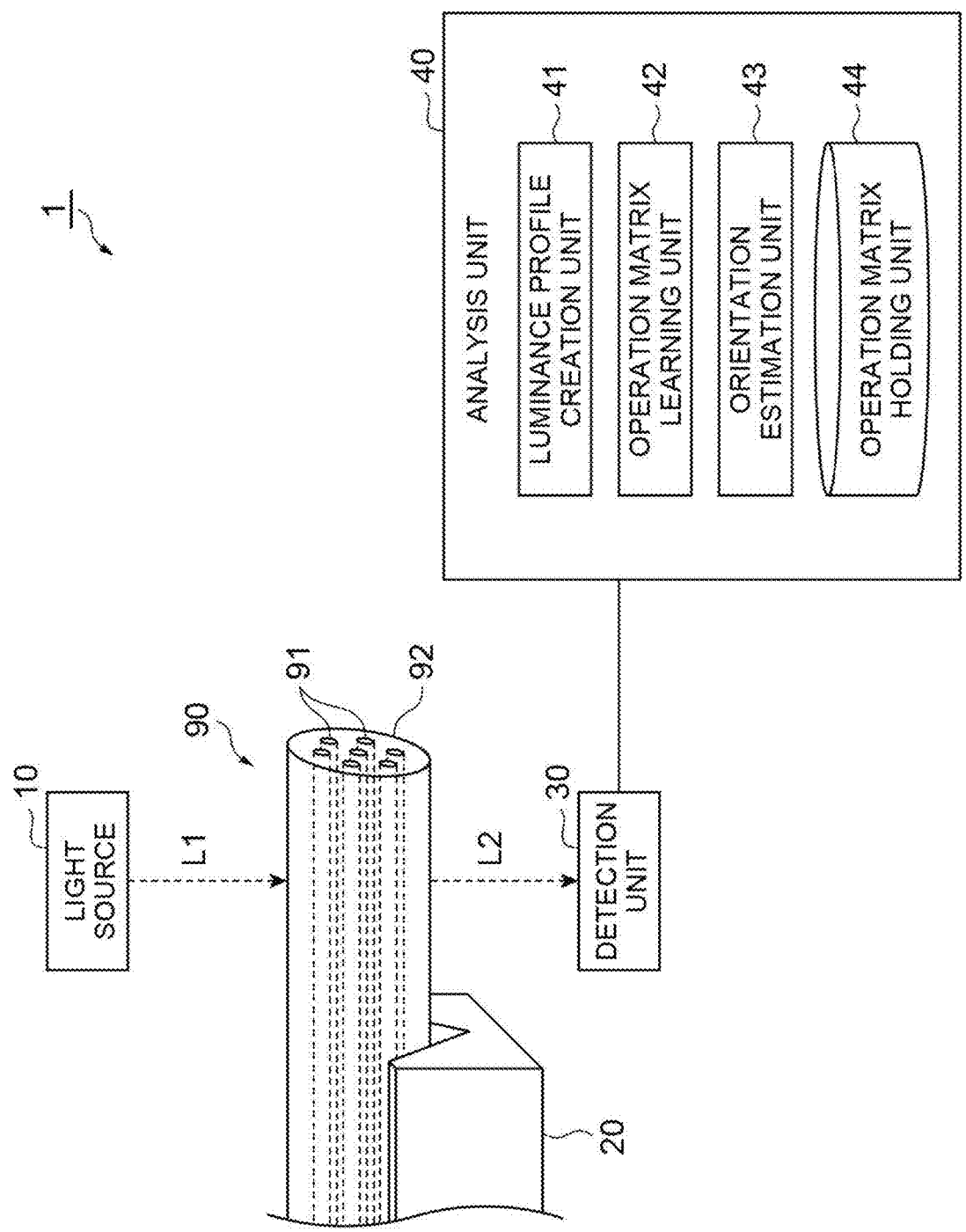
FIG. 1 is a diagram showing an example of a schematic configuration of an orientation estimation device of an optical fiber according to one aspect.

Problems to be Solved by the Present Disclosure

In the method described in Non-Patent Document 1, there is a possibility that an orientation around a central axis of an optical fiber cannot be accurately estimated due to stray light or the like.

The present disclosure has been made in view of the above, and it is an object of the present disclosure to provide a technology capable of more accurately estimating an orientation around a central axis of an optical fiber.

Advantageous Effects of the Present Disclosure

According to the present disclosure, the technology which can estimate the orientation around the central axis of an optical fiber more accurately is provided.

Description of Embodiments of the Present Disclosure

First, the embodiments of the present disclosure are listed and described. A method for estimating an orientation of an optical fiber according to one aspect of the present disclosure includes radiating light from a light source toward a side surface of the optical fiber, capturing an image of the side surface of the optical fiber by receiving the light transmitted through the optical fiber at a plurality of pixels disposed in a direction intersecting a central axis of the optical fiber, generating a luminance profile for the optical fiber based on a luminance value of the light received by the plurality of pixels, and estimating an orientation around the central axis of the optical fiber using the luminance profile.

The estimating of the orientation around the central axis may include applying an operation matrix that extracts the orientation around the central axis from the luminance profile to the luminance profile of the optical fiber.

The method may further include calculating the operation matrix based on a plurality of luminance profiles obtained from optical fibers different from each other and of which the orientations around the central axis are known.

The calculating of the operation matrix may include performing a multivariate analysis on the plurality of luminance profiles obtained from the optical fibers different from each other and of which the orientations around each central axis are known, and obtaining a regression coefficient and a constant of a regression equation in which the orientation around the central axis is set as an objective variable and each of the luminance values included in the luminance profile is set as an explanatory variable.

The generating of the luminance profile may include pre-processing the luminance value of the light received by the plurality of pixels.

The optical fiber may be a polarization maintaining optical fiber. The optical fiber may be a multi-core optical fiber.

The optical fiber may not have a coating member on an outer periphery of a glass cladding. The optical fiber may have a coating member on the outer periphery of the glass cladding.

A method for manufacturing an optical fiber component according to one aspect of the present disclosure may include the method for estimating an orientation of an optical fiber according to the present disclosure, adjusting orientations of a plurality of optical fibers based on the estimated orientation around the central axis, and assembling a fiber array by arranging each of the plurality of optical fibers of which the orientations are adjusted in V-shaped grooves on a substrate.

A method for manufacturing an optical fiber component according to one aspect of the present disclosure may include the method for estimating an orientation of an optical fiber according to the present disclosure, adjusting each of a plurality of optical fibers to have a predetermined orientation with respect to a straight line passing through the plurality of optical fibers based on the estimated orientation around the central axis, and assembling a tape fiber by arranging the plurality of optical fibers of which the orientations are adjusted.

A method for manufacturing an optical fiber component according to one aspect of the present disclosure may include the method for estimating an orientation of an optical fiber according to the present disclosure, adjusting the optical fiber to have a predetermined orientation with respect to a reference orientation provided in a housing based on the estimated orientation around the central axis, and assembling a single-fiber connector by accommodating the optical fiber of which the orientation is adjusted in the housing.

A method for manufacturing an optical fiber component according to one aspect of the present disclosure may include the method for estimating an orientation of an optical fiber according to the present disclosure, adjusting each of a plurality of optical fibers so as to have a predetermined orientation with a straight line connecting a plurality of through holes provided in a ferrule for holding each of the plurality of optical fibers as a reference orientation based on the estimated orientation around the central axis, and assembling a multi-fiber connector by accommodating the plurality of optical fibers of which the orientations are adjusted in the ferrule.

A method for manufacturing an optical fiber component according to one aspect of the present disclosure may include the method for estimating an orientation of an optical fiber according to the present disclosure, adjusting each of the plurality of optical fibers to have a predetermined orientation with respect to a reference orientation provided in a ferrule based on the estimated orientation around the central axis, and assembling a multi-fiber connector by accommodating the plurality of optical fibers of which the orientations are adjusted in the ferrule.

Details of the Embodiment of the Present Disclosure

Hereinafter, embodiments of the present disclosure will be described in detail with reference to an accompanying drawing. In the description of the drawings, the same elements are designated by the same reference numerals, and overlapping descriptions will be omitted. The present invention is not limited to the examples, but is indicated by the scope of the claims, and is intended to include all modifications within the meaning and scope of equivalents of the scope of the claims.

(Orientation Estimation Device Around the Central Axis)

A device for estimating an orientation around a central axis of an optical fiber according to the present embodiment will be described with reference to FIG. 1. An orientation estimation device 1 shown in FIG. 1 has a function of capturing an image of a side surface of a target optical fiber and estimating the orientation around the central axis of the optical fiber based on the captured results. The orientation around the central axis of the optical fiber refers to, for example, an angle formed by a straight line connecting the central axis to a specific core in a cross section perpendicular to the central axis of the optical fiber disposed in the orientation estimation device 1 and the reference line. The optical fiber of which the orientation is to be estimated has a circular cross section. For example, in the case of an optical fiber such as a polarization maintaining optical fiber and a multi-core optical fiber, in which the arrangement of internal cores, or the like, is not axially symmetrical, accurately estimating of the orientation around the central axis (that is, estimating an internal structure) is often important to prevent performance degradation of an optical component. Therefore, the orientation estimation device 1 non-destructively estimates the orientation around the central axis of the optical fiber.

The orientation estimation device 1 receives transmitted light emitted from a target optical fiber 90 by radiating measurement light L1, and acquires a luminance profile of the light transmitted through the optical fiber 90. Then, the orientation around the central axis of the optical fiber 90 is estimated based on this luminance profile. Therefore, the orientation estimation device 1 includes a light source 10, a support unit 20, a detection unit 30 and an analysis unit 40. FIG. 1 illustrates a case in which the target optical fiber 90 is a multi-core optical fiber. For example, in the optical fiber 90, a plurality of cores 91 are disposed in a cylindrical glass cladding 92.

The luminance profile is information including information related to a distribution of luminance of light emitted from the optical fiber 90 after passing through the optical fiber 90 when the light is emitted from the light source 10 to the side surface of the optical fiber 90. The luminance profile includes information related to the distribution of the luminance in a direction intersecting (for example, a direction orthogonal to) an extending direction (the central axis) of the optical fiber 90.

The light source 10 emits measurement light toward a predetermined region. The predetermined region is a region in which the measurement light overlaps the optical fiber 90 when the optical fiber is supported by the support unit 20. A wavelength of the measurement light emitted by the light source 10 can be appropriately selected according to characteristics and conditions of the optical fiber 90. For example, when the optical fiber 90 is not covered with a coating member, the measurement light emitted from the light source 10 may be visible light. Further, when the side surface of the optical fiber 90 is covered with the coating member, for example, near-infrared light (for example, light with a wavelength range of 800 nm to 2500 nm) that can be transmitted through the coating member may be used. In the following embodiments, it is assumed that the optical fiber 90 that is not covered with a coating member is a target of which an orientation around the central axis is to be estimated.

The light source 10 emits the measurement light L1 to a region in which the optical fiber 90 is placed. The light source 10 may include a waveguide optical system or the like for emitting the measurement light L1.

The support unit 20 has a function of supporting the optical fiber at a predetermined position. FIG. 1 shows a member in which a V-shaped groove is formed as an example of the support unit 20, but the configuration of the support unit 20 is not particularly limited as long as it can support the optical fiber 90 while movement thereof is restricted. Moreover, it may also have a structure which supports the optical fiber without using the support unit 20 and performs the capturing. For example, when the orientation around the central axis of the optical fiber is estimated during assembly of the optical component, the side surface of the optical fiber supported by the optical component being assembled may be irradiated with the measurement light L1 from the light source The measurement light L1 output from the light source 10 is transmitted through the optical fiber 90 supported by the support unit 20. Then, some of the light is incident on the detection unit 30 as transmitted light L2.

Figure 2:
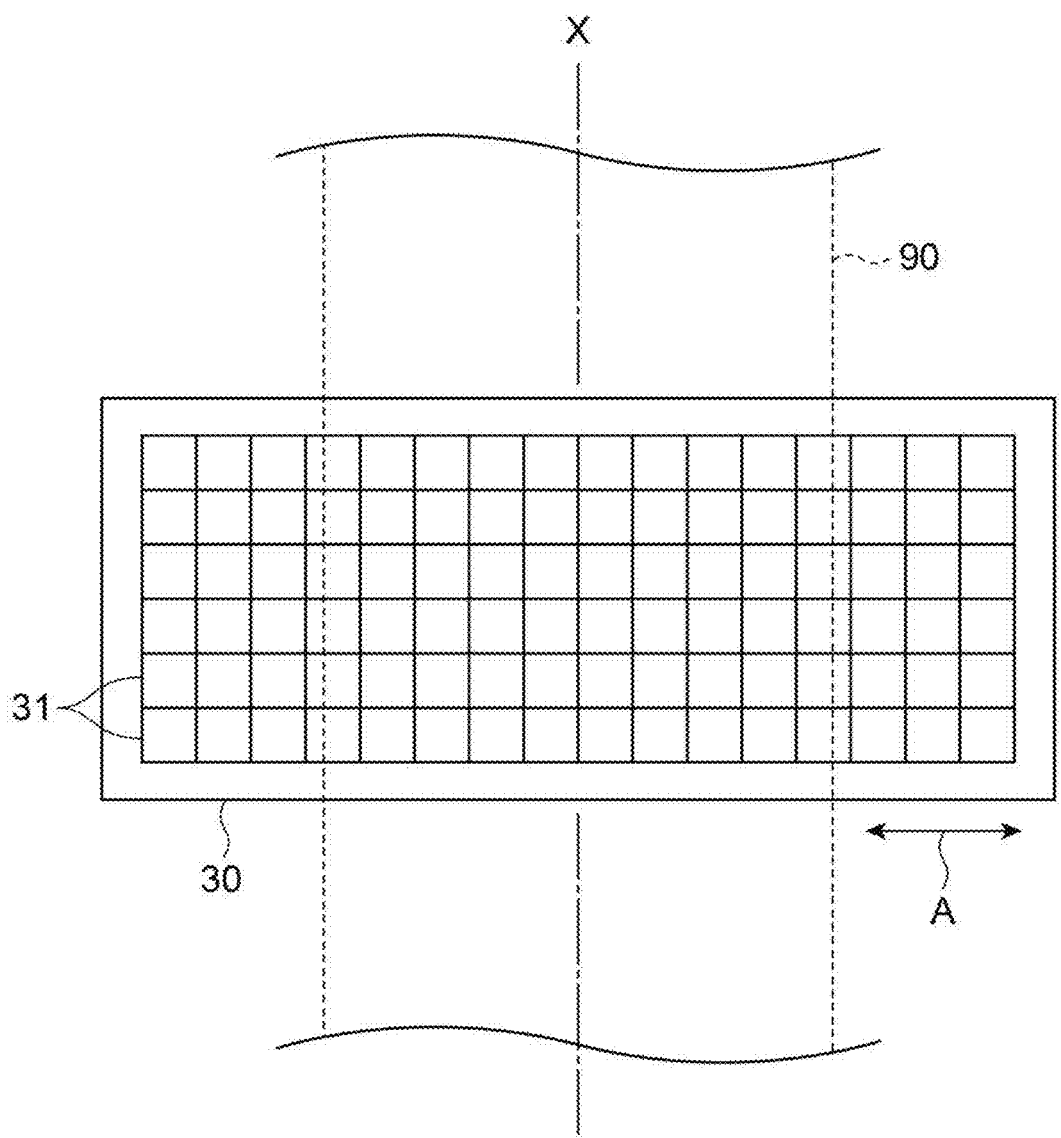
FIG. 2 is a diagram showing an example of an arrangement of pixels in a detection unit.

The detection unit 30 acquires an image of the side of the optical fiber 90, for example, with a plurality of pixels disposed in an array. Specifically, an array sensor in which a plurality of pixels are disposed one-dimensionally or two-dimensionally can be used as the detection unit 30. FIG. 2 is a diagram schematically showing the arrangement of the plurality of pixels 31 in the detection unit 30. FIG. 2 also schematically shows the optical fiber 90 supported by the support unit 20. The plurality of pixels 31 are disposed along an arrow A that extends in a direction perpendicular to the central axis X of the optical fiber 90. In addition, the plurality of pixels 31 may be disposed in an extending direction of the central axis X as well. Although FIG. 2 shows a state in which the pixels 31 are disposed two-dimensionally, they can be disposed at least along the arrow A in the case of one-dimensional arrangement. Instead of using a sensor having the plurality of pixels 31 as the detection unit 30, a single-pixel sensor may be used. However, in order to obtain the luminance profile, image information obtained by capturing different positions of the optical fiber 90 is required as described below. Therefore, in order to use the single-pixel sensor, it is necessary to change a path (a region in which the transmitted light L2 is emitted in the optical fiber 90) of light incident on the pixel of the detection unit 30 in order to obtain the luminance profile. Therefore, when using the single-pixel sensor, it is conceivable to move the optical fiber 90 and the detection unit 30 relatively.

Each of the pixels 31 acquires information that identifies a luminance value of the received light. Each of the pixels 31 records the luminance value in 256 steps (0-255), for example. Each of the pixels 31 outputs the result to the analysis unit 40. The detection unit 30 may collect information related to the luminance value of each of the pixels 31 and then may transmit the information to the analysis unit 40.

The analysis unit 40 has a function of creating a luminance profile from the luminance value detected by the detection unit 30 and estimating the orientation around the central axis of the optical fiber 90 based on the luminance profile. Therefore, the analysis unit 40 includes a luminance profile creation unit 41, an operation matrix learning unit 42, an orientation estimation unit 43, and an operation matrix holding unit 44.

The luminance profile creation unit 41 has a function of creating a luminance profile based on information related to the luminance value obtained from the detection unit 30.

Figure 3:
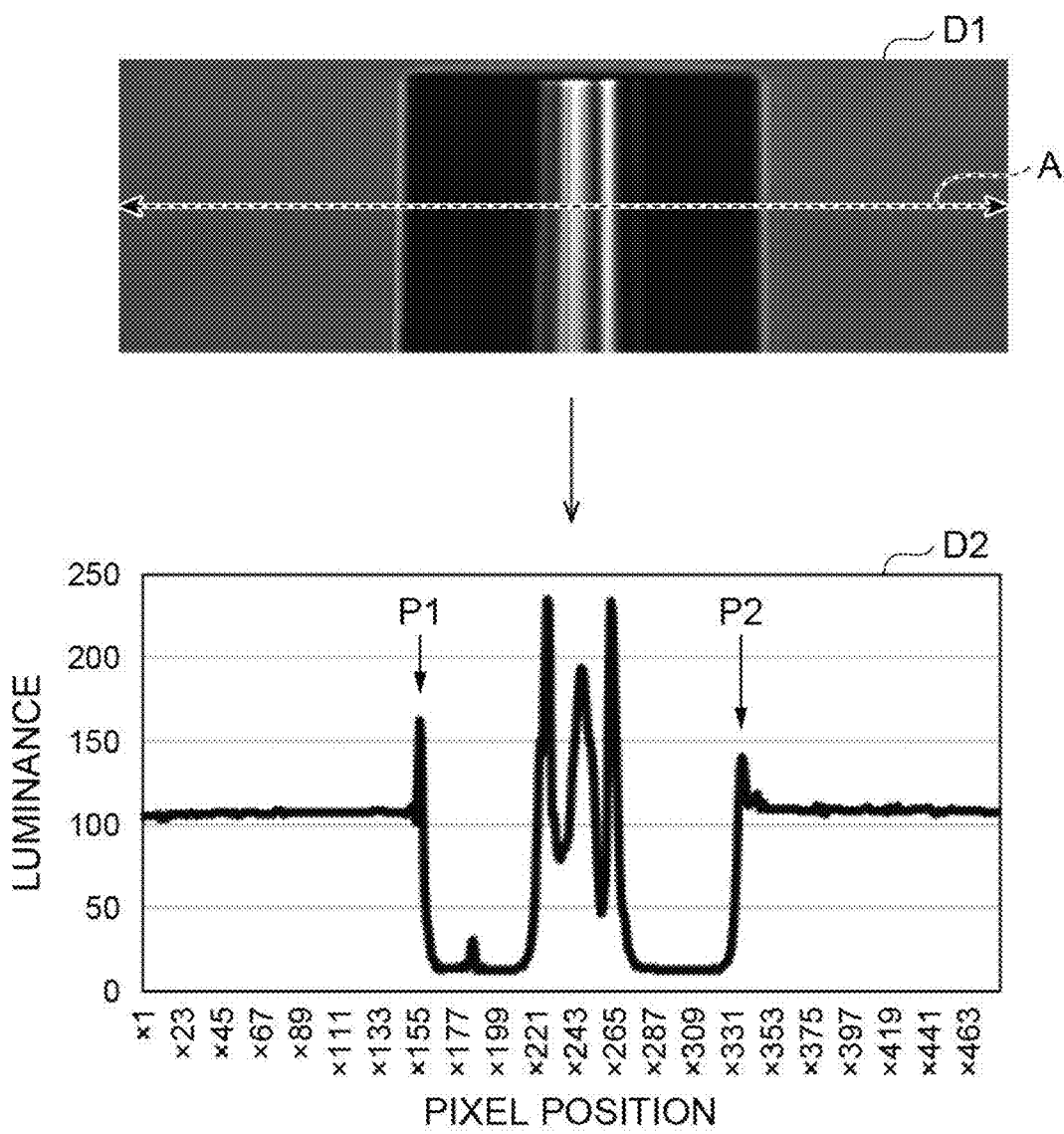
FIG. 3 is a diagram for describing an example of a luminance profile.

The luminance profile will be described with reference to FIG. 3. The luminance profile indicates the distribution of luminance values when an image of the optical fiber 90 is captured from the side. An image D1 in the upper part of FIG. 3 shows an example of an image captured by the detection unit 30, and the lower part of FIG. 3 shows an example of the luminance profile created based on the image D1. The image shown in FIG. 3 is an image of a state in which the optical fiber 90 extends vertically in the center. An arrow A shown in the image D1 in FIG. 3 indicates a direction perpendicular to the central axis X of the optical fiber 90, like the arrow A in FIG. 2. The luminance profile is a distribution of luminance along a direction of the arrow A. As an example, a luminance profile D2 shown in FIG. 3 shows an example in which the number of pixels in the direction of the arrow A is 463. As shown in the luminance profile D2 in FIG. 3, the luminance in a region in which the image of the optical fiber 90 is not captured is about 100, whereas the luminance in a region in which the image of the optical fiber is captured varies greatly. Such a change in the luminance is due to a difference in transmittance of the light incident inside the optical fiber between the core and the glass cladding of the optical fiber 90, a difference in a refractive index between the core and the glass cladding, and the like.

The luminance profile creation unit 41 creates information corresponding to the luminance profile D2 shown in FIG. 3 from the luminance values obtained from the detection unit 30. The luminance profile is not limited to reflecting the luminance value of each of the pixels 31 as it is, and may be obtained by averaging the luminance values of the plurality of pixels that are continuously disposed to extend in the direction of the central axis of the optical fiber 90, for example. In this way, the luminance profile creation unit 41 may perform various operations when the luminance profile is created.

When looking at the luminance profile D2, the arrangement of cores in the multi-core optical fiber can be estimated to some extent. For example, when the target optical fiber 90 is a multi-core optical fiber in which the arrangement of the cores is rotationally symmetrical, the core can be identified by using light refraction at a marker (an identification marker attached to the optical fiber) and a resulting change in the luminance profile. On the other hand, for a multi-core fiber (MCF) in which the arrangement of the cores is rotationally asymmetric, it is possible to identify the core using the light refraction at the asymmetric core and the resulting change in the luminance profile D2.

The operation matrix learning unit 42 has a function of learning the operation matrix for estimating the orientation around the central axis based on the created luminance profile.

The operation matrix is created using a luminance profile of which the orientation around the central axis is known, in order to estimate the orientation around the central axis from the luminance profile. Specifically, a regression equation is obtained with the orientation around the central axis as an objective variable and each of the luminance values included in the luminance profile as an explanatory variable by performing a multivariate analysis. The operation matrix is configured of a regression coefficient and a constant (an intercept) in the regression equation.

As an example of the regression analysis which is a type of multivariate analysis, a case in which a linear regression analysis is performed will be described. For example, when a linear regression analysis of the luminance profile and the orientation around the central axis by the multivariate analysis method is performed, a regression coefficient vector B1 and a constant b2 which are used for an operation of a prediction value of the orientation around the central axis are obtained. In the present embodiment, the regression coefficient vector B1 and the constant b2 are referred to as an operation matrix.

The regression coefficient vector B1 and the constant b2 described above are elements constituting a regression equation that can extract the orientation around the central axis by performing a linear operation on the luminance profile. Therefore, it is possible to extract the orientation around the central axis using the following Equation (1). In Equation (1), A(x) indicates the luminance profile, and a regression coefficient vector B1(x) indicates a vector of the same dimension as the luminance profile A(x). Also, the constant b2 is a scalar value. Orientation prediction value around central axis=B1(x) A(x)+b2 . . . (1)

The process of preliminarily identifying the regression coefficient vector B1 and the constant b2 for extracting the orientation around the central axis from the luminance profile using the linear regression analysis is referred to as learning of the operation matrix. The orientation around the central axis is known, and parameters related to a correspondence relationship between the orientations around the central axis and the luminance profiles are calculated using a plurality of luminance profiles measured at various orientations around the central axis. The parameters thus obtained correspond to the operation matrix (the regression coefficient vector B1 and the constant b2).

The image obtained by capturing the side surface of the optical fiber 90 and the luminance profile obtained from the image may vary according to the orientation around the central axis as described above, but may also vary according to other factors. For example, a variation in a position of the optical fiber 90 itself, a variation in a diameter of the glass cladding 92 of the optical fiber 90 due to a production lot, and a variation in a position of a refractive index change part formed at an interface between the core 91 and the glass cladding 92 can vary the luminance profile. On the other hand, it is possible to separate a variation of the luminance profile due to the orientation around the central axis from a variation of the luminance profile due to other factors (described above) by performing the operation using the matrix.

For example, assuming that the luminance profile is 1×n data obtained from n pixel sensors, the luminance profile can be expressed as one point in an n-dimensional space. Here, operating the above operation matrix (the regression coefficient vector B1 and the constant b2) and the target luminance profile of which the orientation around the central axis is estimated involves projecting the data on the n-dimensional space onto a luminance variation axis due to rotation and extracting only a luminance variation component due to rotation. A profile variation on the variation axis other than rotation is excluded by the operation. Therefore, the method using the operation matrix described above can be a method for detecting an orientation around the central axis in which accuracy does not decrease even when there are variations due to external factors such as a difference in a production lot.

As an example of the regression analysis, a nonlinear regression analysis may be performed. For example, when a nonlinear regression analysis of the luminance profile and the orientation around the central axis by a multivariate analysis method is performed, a regression coefficient vector B1, a constant b2 and a non-linear function f which are used to operate the prediction value of the orientation around the central axis are obtained. In the case of the nonlinear regression analysis, the regression coefficient vector B1, the constant b2, and the nonlinear function f are referred to as the operation matrix in the present embodiment.

The regression coefficient vector B1, the constant b2, and the nonlinear function f described above are elements that can extract the orientation around the central axis by the nonlinear operation with the luminance profile. Therefore, it is possible to extract the orientation around the central axis using the following Equation (2): Orientation prediction value around central axis=f(B1(x), A(x))+b2 . . . (2). In Equation (2), A(x) indicates a luminance profile, and the regression coefficient vector B1(x) indicates a vector of the same dimension as the luminance profile A(x). Also, the constant b2 is a scalar value. Further, the nonlinear function f is a nonlinear function having the regression coefficient vector B1(x) and the luminance profile A(x) as variables.

In the case of the nonlinear regression analysis, the relationship between the regression coefficient vector B1 and the luminance profile A(x) is identified by the nonlinear function f.

In the operation matrix learning unit 42, it may be determined in advance which analysis method of the multivariate analysis is to be used. Further, it may be determined by referring to the acquired luminance profile and considering a correlation between the luminance profile and the orientation around the central axis. Then, the operation matrix for estimating the orientation around the central axis is calculated based on a plurality of luminance profiles created for calculating the operation matrix. The operation matrix calculated through the above processing is held in the operation matrix holding unit 44.

The orientation estimation unit 43 has a function of estimating the orientation around the central axis based on the luminance profile obtained by capturing an image of the target optical fiber 90. When the orientation around the central axis is estimated, the operation matrix calculated in the operation matrix learning unit 42 and held in the operation matrix holding unit 44 is applied to the luminance profile. Thus, the orientation around the central axis of the target optical fiber 90 is calculated.

The operation matrix holding unit 44 has a function of holding the operation matrix calculated by the operation matrix learning unit 42.

Figure 4:
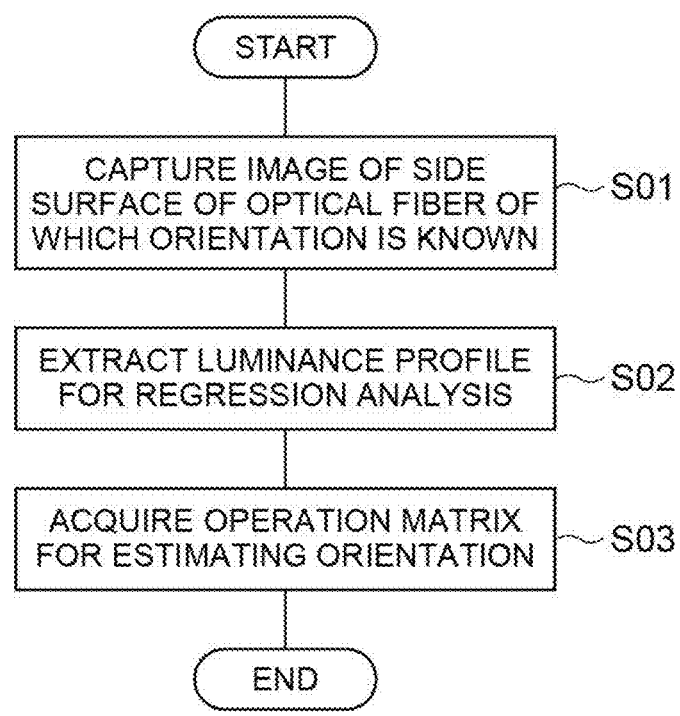
FIG. 4 is a flow chart showing an example of a method for creating an operation matrix.

(Operation Matrix Learning Method)
A method for calculating (learning) an operation matrix used for estimating the orientation around the central axis in the orientation estimation device 1 will be described with reference to FIG. 4.

In Step S01, in a state in which the optical fiber 90 of which the orientation around the central axis is known is supported by the support unit 20, the side surface of the optical fiber 90 is irradiated with the measurement light L1 from the light source 10, and the transmitted light L2 is received by each of the pixels 31 of the detection unit 30, whereby an image of the optical fiber 90 is captured from the side.

There is no particular limitation on the method for capturing an image in a state in which the orientation around the central axis is known, but for example, a method for measuring the orientation around the central axis using a method other than the image capturing method using the light source 10 and the detection unit 30 can be used. As an example, the optical fiber 90 is rotated or the light source 10 and the detection unit 30 are moved along the outer periphery of the optical fiber 90 in a state in which an end surface of the optical fiber 90 can be observed and the orientation around the central axis can be grasped. Thus, it is possible to acquire an image of the optical fiber 90 observed from the side for each of the orientations around the central axis. As another example, an optical fiber (a master fiber) of which core arrangement is known is prepared, and the optical fiber 90 that is a target for acquiring a lateral image is disposed so that the end surfaces thereof face each other. In this state, light is guided through the core along the central axis of the master fiber and received by the optical fiber 90 through the facing end surfaces. The intensity of the light received by the optical fiber 90 can vary according to a core arrangement relationship between the master fiber and the optical fiber 90. Therefore, the orientation around the central axis of the optical fiber 90 with respect to the master fiber can be grasped by measuring the intensity of the light received by the optical fiber 90. While the intensity of light received by optical fiber 90 from the master fiber is monitored, the optical fiber 90 is rotated, or the light source 10 and the detection unit 30 are moved along the outer periphery of the optical fiber 90. Thus, it is possible to acquire the image of the optical fiber 90 observed from the side for each of the orientations around the central axis.

Instead of the method for measuring the orientation around the central axis of the optical fiber 90, a simulation or the like may be combined. For example, there is a method in which, assuming that the optical fiber has a shape and characteristics as designed, a path of the light when the optical fiber is irradiated with the light from the light source 10 is calculated in advance by a simulation, and a side image in a specific orientation around the central axis is obtained from the simulation results.

Returning to FIG. 4, in Step S02, a luminance profile creation process is performed. Specifically, in the luminance profile creation unit 41 of the analysis unit 40, information corresponding to the luminance profile shown in FIG. 3 is created from the information related to the luminance value obtained by the detection unit 30 as described above. At this time, as described above, for example, pre-processing such as averaging the luminance values of the plurality of pixels continuously disposed extending in the direction of the central axis of the optical fiber 90 may be appropriately performed.

In some cases, the image may be captured while the optical fiber 90 is moved (shifted) along a direction (the direction of the arrow A) perpendicular to the central axis X. In this case, an outer periphery (a boundary between the glass cladding 92 and the outside) of the optical fiber 90 may be identified from a change in the luminance value measured at each of the pixels 31, and correction in the direction of the arrow A may be performed. For example, in the example shown in FIG. 3, peaks P1 and P2 at which the luminance value changes greatly occur at the boundary between the glass cladding 92 and the outside. The luminance value is about 100 outside the peaks P1 and P2, while the luminance value changes greatly inside (between the peaks P1 and P2). Therefore, it can be understood that the peaks P1 and P2 indicate the boundary between the inside and outside of the optical fiber 90. Even when the image is captured in a state in which the optical fiber 90 is slightly moved in the direction of the arrow A (for example, by several pixels), it is believed that the peaks P1 and P2 shown in FIG. 3 can be identified. Therefore, image capturing conditions of the luminance profile acquired from each of the images obtained by capturing the image of the optical fiber 90 can be made constant by adjusting the position of the pixels 31 in the arrangement direction (the direction of the arrow A) using the change in the luminance value included in the luminance profile and calculating the operation matrix with a position of the outer periphery of the optical fibers 90 aligned. A position adjustment in an arrangement direction (the direction of the arrow A) of the pixels 31 can be similarly performed for the luminance profile obtained from the optical fiber 90 of which the orientation around the central axis is to be estimated.

In Step S03, the operation matrix for estimating the orientation around the central axis is calculated. Specifically, in the operation matrix learning unit 42 of the analysis unit 40, the operation matrix for estimating the orientation around the central axis is calculated based on the created luminance profile. The calculated operation matrix is held in the operation matrix holding unit 44. With the above processing, the calculation of the operation matrix as a pre-stage for estimating the orientation around the central axis is completed. For example, cross-validation or the like may be performed in order to verify the accuracy of the operation matrix after the process of calculating the operation matrix. In that case, a luminance profile required for the cross-validation may be prepared separately.

Figure 5:
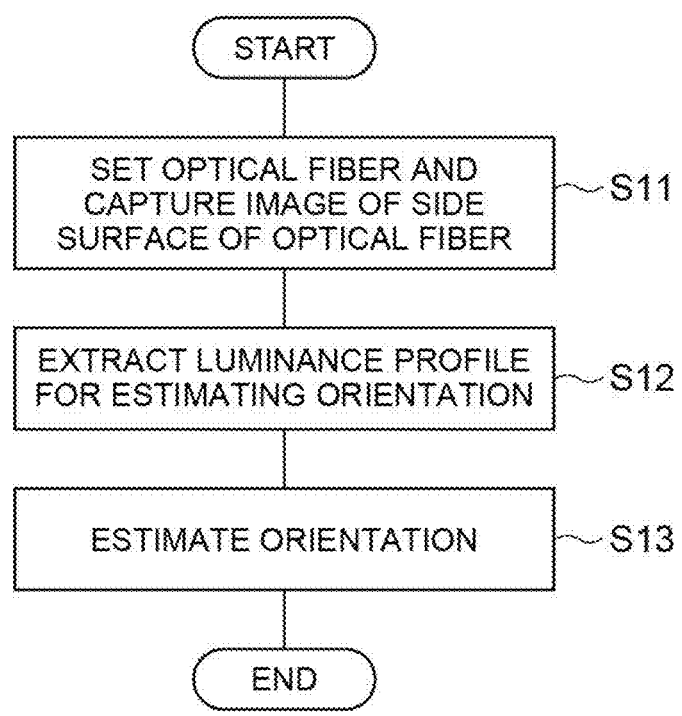
FIG. 5 is a flow chart showing an example of a method for estimating an orientation of an optical fiber.

(Method for Estimating Orientation Around Central Axis)
In the orientation estimation device 1, a method for estimating the orientation around the central axis of the optical fiber 90 of which the orientation around the central axis is unknown will be described with reference to FIG. 5.

In Step S11, in a state in which the optical fiber 90 of which the orientation around the central axis is unknown is supported by the support unit 20, the side surface of the optical fiber 90 is irradiated with the measurement light L1 from the light source 10, and the transmitted light L2 is received by each of the pixels 31 of the detection unit 30, whereby the image of the optical fiber 90 is captured from the side. The image of the optical fiber 90 of which the orientation around the central axis is unknown is captured under the same conditions as when the luminance profile used for calculation of the operation matrix is obtained. Thus, the image capturing results suitable for use of the operation matrix can be obtained.

In Step S12, processing for creating a luminance profile is performed from the image capturing results of the optical fiber 90. Specifically, in the luminance profile creation unit 41 of the analysis unit the information corresponding to the luminance profile D2 shown in FIG. 3 is created from the information relating to the luminance value obtained by the detection unit 30 as described above. At this time, for example, pre-processing such as averaging the luminance values of the plurality of pixels continuously disposed to extend in the central axis direction of the optical fiber 90 may be performed. When the pre-processing is performed, it is required to perform the same pre-processing as that performed when the operation matrix is created.

In Step S13, the estimation of the orientation around the central axis is performed based on the luminance profile. Specifically, the orientation estimation unit 43 of the analysis unit 40 estimates the orientation around the central axis by applying the operation matrix held in the operation matrix holding unit 44 to the luminance profile. With the above processing, the estimation of the orientation around the central axis is completed. For example, estimation results may be configured to be output to the outside, or may be configured to be output to a monitor or the like connected to the analysis unit 40.

(Method for Assembling Optical Fiber Component)

Figure 6:
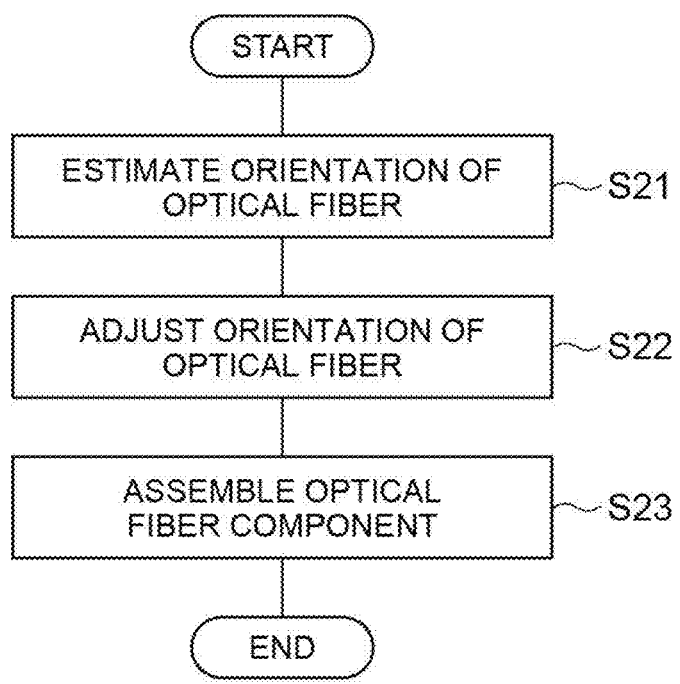
FIG. 6 is a flow chart showing an example of a method for assembling an optical fiber component.

A method for assembling an optical fiber component (an optical component incorporating an optical fiber) using an optical fiber of which the orientation around the central axis is estimated using the orientation estimation device 1 will be described with reference to FIG. 6. As described above, a difference in the orientation around the central axis of the optical fiber can affect optical coupling loss and the like when the optical fibers are connected. Therefore, when the orientation around the central axis of the optical fiber 90 can be estimated more accurately using the orientation estimation device 1, an optical fiber component with lower loss can be manufactured in consideration of the orientation around the central axis. FIG. 6 shows the method for assembling an optical fiber component.

In Step S21, the orientation around the central axis is estimated for the optical fiber 90 of which the orientation around the central axis is unknown. A specific method for estimating the orientation around the central axis is based on, for example, the procedure shown in FIG. 5. The orientation around the central axis of the optical fiber 90 is estimated by the method shown in FIG. 5. The estimation of the orientation around the central axis may be performed, for example, during an assembly of the optical fiber component. In that case, for example, the light source 10 and the detection unit 30 may be disposed to the side of the optical fiber component in the middle of assembly so as to perform the image capturing without using the support unit 20.

In Step S22, the orientation around the central axis is adjusted based on the estimation results of the orientation around the central axis. Also, in Step S23, the assembly of the optical fiber component is performed. Step S22 and Step S23 may be performed simultaneously (in parallel). As an example, an angle of the optical fiber 90 may be adjusted so that the optical fiber 90 is directed in a predetermined direction based on the estimation results of the orientation around the central axis of the optical fiber 90 disposed on the support unit 20. Further, when the estimation of the orientation around the central axis of the optical fiber 90 during the assembly is performed, the orientation around the central axis of the optical fiber 90 may be finely adjusted based on the estimation results.

FIGS. 7 to 10 show optical fiber components that can be manufactured by performing the estimation of the orientation around the central axis of the optical fiber 90 described above.

Figure 7:
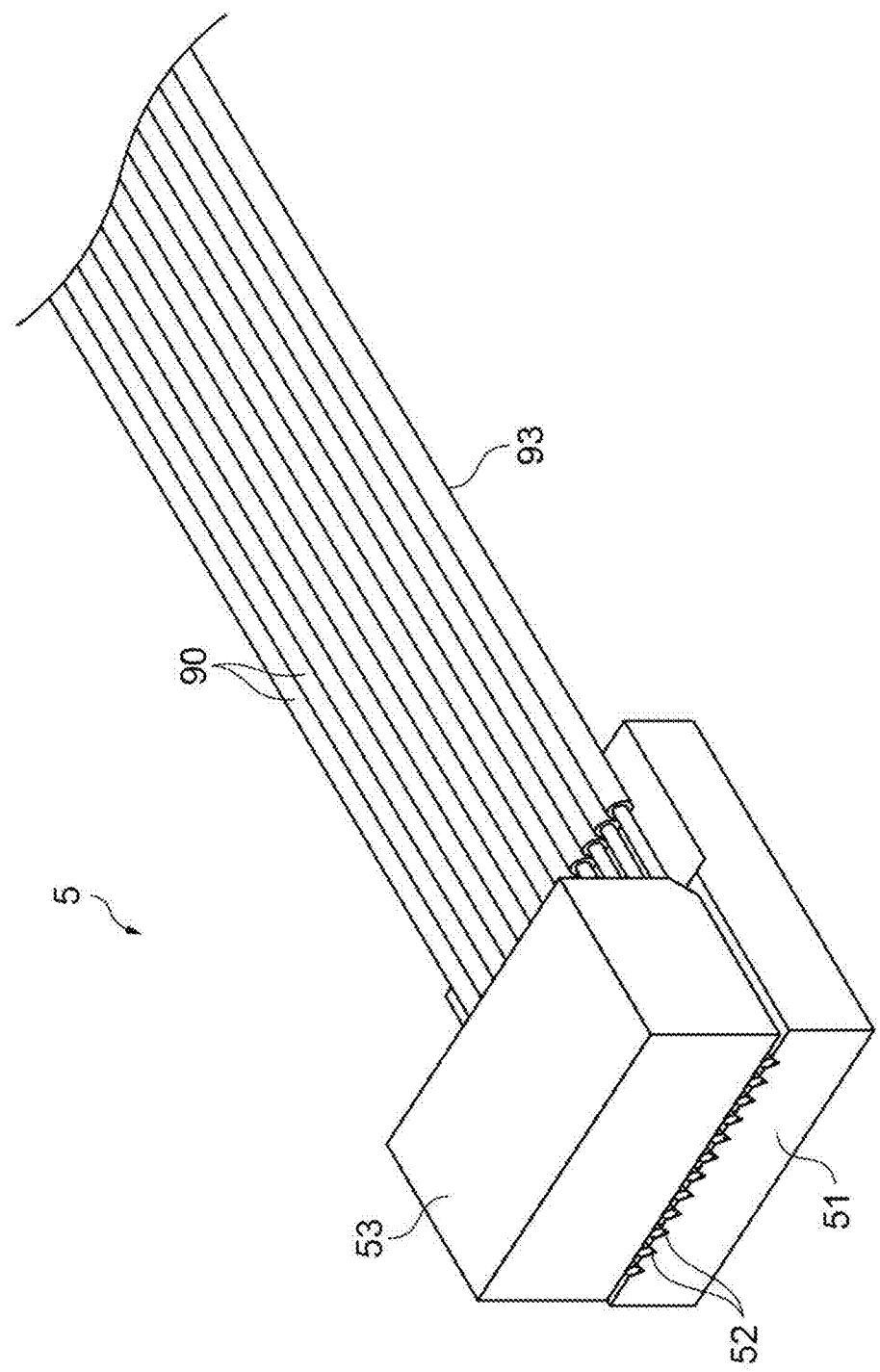
FIG. 7 is a diagram showing an example of a schematic configuration of a fiber array which is an example of the optical fiber component.

FIG. 7 shows a fiber array as an example of the optical fiber component. The fiber array 5 is a component in which a plurality of optical fibers 90 are disposed between a glass substrate 51 having V-shaped grooves 52 formed therein and a pressing glass plate 53. The optical fibers 90 are fixed by, for example, a resin while being disposed in each of the plurality of V-shaped grooves 52. A coating 93 is removed from the optical fiber 90 in a region sandwiched between the glass substrate 51 and the pressing glass plate 53.

In the fiber array 5 described above, it is required to appropriately manage the orientations around the central axes of the optical fibers 90 at the end surfaces of the plurality of optical fibers 90 sandwiched between the glass substrate 51 and the pressing glass plate 53. That is, performance of the fiber array 5 is improved by fixing the plurality of optical fibers 90 with a resin in a state in which the orientations around the respective central axes are adjusted. Therefore, the fiber array 5 with higher performance can be manufactured by adjusting the orientation around the central axis of each of the plurality of optical fibers by the above-described method, fixing them with a resin, and then assembling them as the fiber array 5. A reference orientation that serves as a reference for adjusting the orientation around the central axis at this time can be provided in the V-shaped groove 52 of the glass substrate 51, for example.

Figure 8:
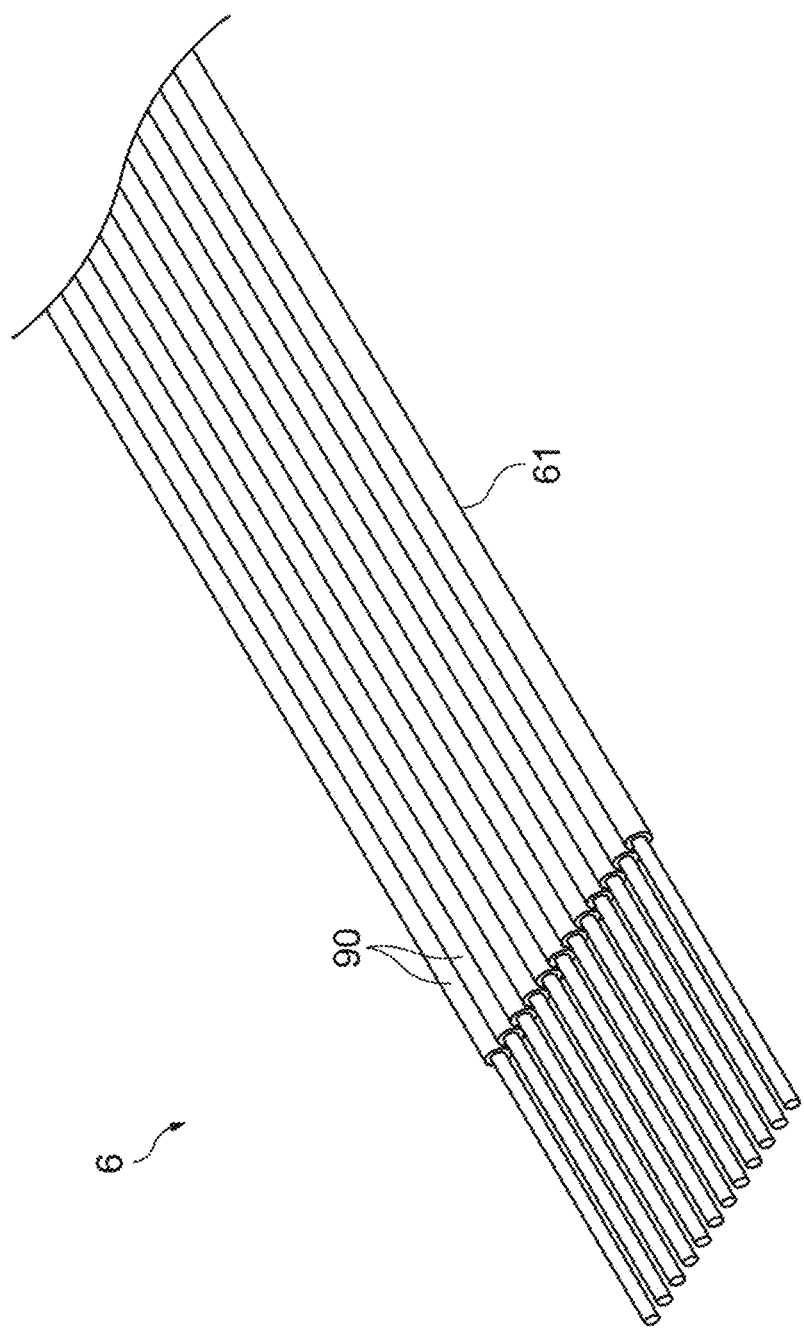
FIG. 8 is a diagram showing an example of a schematic configuration of a tape fiber which is an example of the optical fiber component.

FIG. 8 shows a tape fiber as an example of the optical fiber component. The tape fiber 6 is a solidified state in which the plurality of optical fibers 90 are disposed in one direction and coated with an integral coating 61 formed of a resin or the like. A shape of the coating is not particularly limited. The above tape fiber 6 is required to appropriately manage the orientations around the central axes of the optical fibers 90 at the end surfaces of the plurality of optical fibers 90. That is, the performance of the tape fiber 6 is improved by fixing the plurality of optical fibers 90 with a resin in a state in which the orientations around the respective central axes are adjusted. Therefore, tape fiber 6 can be manufactured with higher performance by adjusting the orientation around the central axis of each of the plurality of optical fibers 90 by the method described above and then fixing them with a resin. A reference orientation that serves as a reference for adjusting the orientation around the central axis at this time can be, for example, a line passing through the plurality of optical fibers 90.

Figure 9:
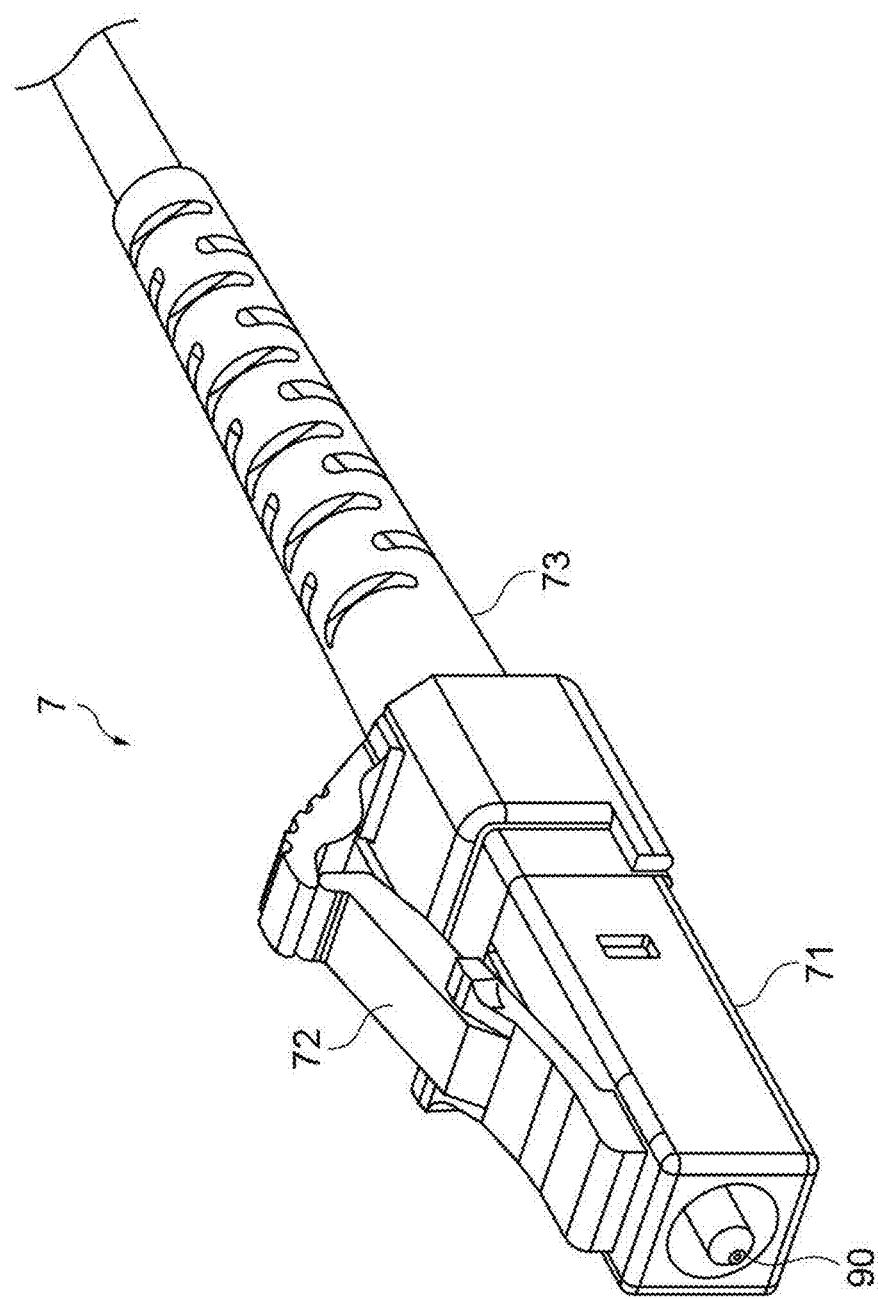
FIG. 9 is a diagram showing an example of a schematic configuration of a single-fiber connector which is an example of the optical fiber component.

FIG. 9 shows a single-fiber connector as an example of the optical fiber component. The single-fiber connector 7 is a connector for one optical fiber 90. The single-fiber connector 7 has a housing 71 and a boot 73. The housing 71 is a portion that covers an end portion of the optical fiber 90 and is a portion that supports the end portion of the optical fiber 90. The housing 71 may include a latching portion 72 that engages with an adapter when the single-fiber connector 7 is introduced into the adapter of the other party. The boot 73 is a substantially cylindrical member, and is a portion that prevents excessive bending stress from occurring in the optical fiber 90 that extends from the housing 71 to the outside.

The above-described single-fiber connector 7 is particularly required to appropriately manage the orientation around the central axis of the optical fiber 90 at the end surface (a portion in which the optical fiber 90 is exposed at a tip end of the housing 71) of the optical fiber 90 in the housing 71. That is, the performance of the single-fiber connector 7 is improved by accommodating the optical fiber 90 in the housing 71 in a state in which the orientation around the central axis of the optical fiber is adjusted. Therefore, the single-fiber connector 7 with higher performance can be manufactured by adjusting the orientation around the central axis of the optical fiber 90 by the method described above and then fixing the optical fiber 90 to the housing 71. A reference orientation that serves as a reference for adjusting the orientation around the central axis at this time may be provided in the housing 71, for example.

Figure 10:
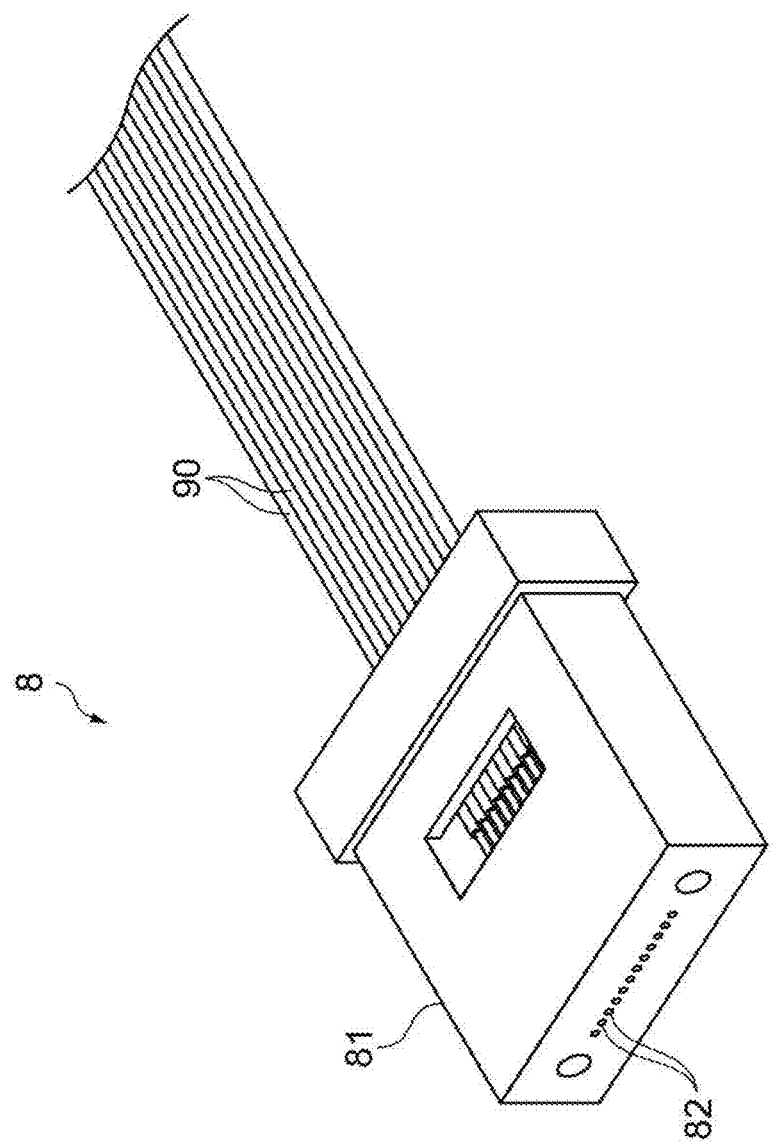
FIG. 10 is a diagram showing an example of a schematic configuration of a multi-fiber connector which is an example of the optical fiber component.

FIG. 10 shows a multi-fiber connector as an example of the optical fiber component. The multi-fiber connector 8 includes a ferrule 81 having a plurality of through holes 82. A plurality of optical fibers are inserted into the through holes 82 of the ferrule 81 in a state in which the coatings thereof are removed. In this state, by engaging an end portion of the ferrule 81 with an adapter (not shown), each of the plurality of optical fibers 90 is connected to the optical fiber on the adapter side.

The multi-fiber connector 8 described above is required to appropriately manage the orientation around the central axis of each of the optical fibers 90 particularly at the end surface (the portion in which the optical fiber 90 is exposed at the end portion of the through hole 82) of the optical fiber 90 in the through hole 82 of the ferrule 81. That is, the performance of the multi-fiber connector 8 is improved by inserting and fixing the optical fibers 90 into the through holes 82 of the ferrule 81 in a state in which the orientations around the respective central axes of the plurality of optical fibers 90 are adjusted. Therefore, the multi-fiber connector 8 with higher performance can be manufactured by adjusting the orientation around the central axis of the optical fiber 90 by the method described above and fixing the optical fibers 90 to the through holes 82 of the ferrule 81. The reference orientation that serves as a reference for adjusting the orientation around the central axis at this time may be, for example, a straight line that connects the plurality of through holes 82. Further, a reference line separately provided on the ferrule 81 may be used.

(Actions)

The luminance profile obtained by capturing an image of the side surface of the optical fiber may include a change in the luminance that reflects the internal structure of the optical fiber. Therefore, the orientation around the central axis of the optical fiber can be estimated more accurately by estimating the orientation around the central axis of the optical fiber using the information.

Further, since the orientation around the central axis is estimated by applying an operation matrix for extracting the relationship with the orientation around the central axis from the luminance profile to the luminance profile, in the luminance profile, the change in the profile due to factors other than the orientation around the central axis can be separated from the change in the profile due to the orientation around the central axis. Therefore, the orientation around the central axis can be estimated with higher accuracy. A configuration in which the orientation around the central axis of the optical fiber is estimated by a method that does not use the operation matrix may be adopted. For example, it is possible to use a method for estimating the orientation around the central axis from a change in the luminance value at a specific position in the luminance profile.

In addition, a regression equation in which the orientation around the central axis is set as an objective variable and each of the luminance values included in the luminance profile is set as an explanatory variable is obtained by performing a multivariate analysis on a plurality of luminance profiles obtained from the optical fibers of which the orientations around the central axes are known. Regression coefficients and constants at this time become an operation matrix. In this case, since the operation matrix that appropriately reflects each component included in the luminance profile is obtained, the orientation around the central axis can be estimated with higher accuracy.

In the above embodiment, the case in which the regression analysis is performed has been described as an example of the multivariate analysis, but the method for creating an operation matrix, that is, the method for identifying the relationship between the luminance profile and the orientation around the central axis is not limited to the regression analysis, and a known method of the multivariate analysis can be used. Also, the operation matrix may be calculated by a method different from the multivariate analysis. Examples of the method for calculating the operation matrix may include a principal component analysis, a partial least squares regression, a support vector machine, and the like.

It is possible to obtain an operation matrix that more appropriately reflects the relationship between the luminance profile and the orientation around the central axis by calculating the operation matrix based on a plurality of luminance profiles with different orientations around the central axis, which are obtained from an optical fiber of which the orientation around the central axis is known.

In addition, instead of setting the luminance values of the light received by the plurality of pixels as the luminance profile as they are, some operation processing is performed on the luminance values. Since the luminance profile is generated after the pre-processing is performed, and thus, for example, it is possible to reduce a component or the like derived from noise by the pre-processing, the orientation around the central axis can be estimated more accurately. The method for pre-processing is not limited to the one described above, and for example, processing such as normalization may be performed.

In addition, the above-described method for estimating the orientation around the central axis is useful for optical fibers that require alignment, such as polarization maintaining optical fibers and multi-core optical fibers, in which the difference in the orientation around the central axis may affect the coupling loss.

Further, the optical fiber may have a configuration in which no coating member is provided on the outer periphery of the glass cladding, or may have a configuration in which the coating member is provided thereon. The orientation around the central axis can be accurately estimated regardless of the presence or absence of the coating member by appropriately selecting the light source.

Moreover, in the above embodiments, the method for manufacturing a plurality of types of optical fiber components has been described. In the above example, the orientation around the central axis of the optical fiber included in the optical fiber component is estimated using the above-described method for estimating an orientation of the optical fiber, and the optical fiber is adjusted based on the estimated orientation around the central axis. Each of the optical fiber components is then assembled. According to the above-described method for manufacturing an optical fiber component, since the optical fiber component is manufactured using the optical fiber of which the orientation around the central axis is more accurately estimated using the method for estimating an orientation of the optical fiber, the optical fiber component is manufactured in a state in which an angle thereof is adjusted with higher accuracy. Therefore, an optical fiber component with higher performance is obtained.

REFERENCE SIGNS LIST

1 Orientation estimation device
5 Fiber array
6 Tape fiber
7 Single-fiber connector
8 Multi-fiber connector
10 Light source
20 Support unit
30 Detection unit
31 Pixel
40 Analysis unit
41 Luminance profile creation unit
42 Operation matrix learning unit
43 Orientation estimation unit
44 Operation matrix holding unit
51 Glass substrate
52 V-shaped groove
53 Pressing glass plate
61 Coating
71 Housing
72 latching portion 73 Boot
81 Ferrule
82 Through hole
90 Optical fiber
91 Core
92 Glass cladding
93 Coating
D1 Image
D2 Luminance profile
f Nonlinear function
L1 Measurement light
L2 Transmitted light
P1, P2 Peak
X Central axis

The invention claimed is:

1. A method for estimating an orientation of an optical fiber, comprising:
radiating light from a light source toward a side surface of the optical fiber;
capturing an image of the side surface of the optical fiber by receiving the light transmitted through the optical fiber at a plurality of pixels disposed along a direction intersecting a central axis of the optical fiber;
generating a luminance profile for the optical fiber based on a luminance value of light received by the plurality of pixels; and
estimating an orientation around the central axis of the optical fiber using the luminance profile,
wherein, in the estimating, the orientation around the central axis of the optical fiber is estimated by using the luminance profile of the optical fiber and a master luminance profile of a master optical fiber whose orientation around a central axis is known by observing an end face of the master optical fiber or whose orientation around a central axis is simulated.

2. The method for estimating an orientation of an optical fiber according to claim 1, wherein the estimating of the orientation around the central axis includes applying to the luminance profile an operation matrix that extracts the orientation around the central axis from the luminance profile.

3. The method for estimating an orientation of an optical fiber according to claim 2, further comprising
calculating the operation matrix based on a plurality of luminance profiles obtained from different optical fibers of which orientations around the central axis are known.

4. The method for estimating an orientation of an optical fiber according to claim 3, wherein the calculating of the operation matrix includes performing a multivariate analysis on the plurality of luminance profiles obtained from the different optical fibers of which the orientations around the central axis are known, and obtaining a regression coefficient and a constant of a regression equation in which the orientation around the central axis is set as an objective variable and each of the luminance values included in the luminance profile is set as an explanatory variable.

5. The method for estimating an orientation of an optical fiber according to claim 1, wherein the generating of the luminance profile includes pre-processing the luminance values of the light received by the plurality of pixels.

6. The method for estimating an orientation of an optical fiber according to claim 1, wherein the optical fiber is a polarization maintaining optical fiber.

7. The method for estimating an orientation of an optical fiber according to claim 1, wherein the optical fiber is a multi-core optical fiber.

8. The method for estimating an orientation of an optical fiber according to claim 1, wherein the optical fiber does not have a coating member on an outer periphery of a glass cladding.

9. The method for estimating an orientation of an optical fiber according to claim 1, wherein the optical fiber has a coating member on an outer periphery of a glass cladding.

10. A method for manufacturing an optical fiber component, comprising:
the method for estimating an orientation of an optical fiber according to claim 1; and
adjusting orientations of a plurality of optical fibers based on the estimated orientations around each central axis, and assembling a fiber array by arranging each of the plurality of optical fibers of which the orientations are adjusted in V-shaped grooves on a substrate.

11. A method for manufacturing an optical fiber component, comprising:
the method for estimating an orientation of an optical fiber according to claim 1; and
adjusting each of a plurality of optical fibers to have a predetermined orientation with respect to a straight line passing through the plurality of optical fibers based on the estimated orientation around the central axis, and assembling a tape fiber by arranging the plurality of optical fibers of which the orientations are adjusted.

12. A method for manufacturing an optical fiber component, comprising:
the method for estimating an orientation of an optical fiber according to claim 1; and
adjusting the optical fiber to have a predetermined orientation with respect to a reference orientation provided in a housing based on the estimated orientation around the central axis, and assembling a single-fiber connector by accommodating the optical fiber of which the orientation is adjusted in the housing.

13. A method for manufacturing an optical fiber component, comprising:
the method for estimating an orientation of an optical fiber according to claim 1; and
adjusting each of a plurality of optical fibers so as to have a predetermined orientation with a straight line connecting a plurality of through holes provided in a ferrule for holding each of the plurality of optical fibers as a reference orientation based on the estimated orientation around the central axis, and assembling a multi-fiber connector by accommodating the plurality of optical fibers of which the orientations are adjusted in the ferrule.

14. A method for manufacturing an optical fiber component, comprising:
the method for estimating an orientation of an optical fiber according to claim 1; and
adjusting each of the plurality of optical fibers to have a predetermined orientation with respect to a reference orientation provided in a ferrule based on the estimated orientation around the central axis, and assembling a multi-fiber connector by accommodating the plurality of optical fibers of which the orientations are adjusted in the ferrule.

15. The method for estimating an orientation of an optical fiber according to claim 1, further comprising:
radiating light from a light source toward a side surface of the master optical fiber;
capturing an image of the side surface of the master optical fiber by receiving the light transmitted through the master optical fiber at a plurality of pixels disposed along a direction intersecting a central axis of the master optical fiber;
generating the master luminance profile based on a luminance value of light received by the plurality of pixels.

* * * * *